(12) United States Patent
Imai et al.

(10) Patent No.: US 8,324,293 B2
(45) Date of Patent: *Dec. 4, 2012

(54) AQUEOUS INK, INK JET RECORDING METHOD, INK CARTRIDGE, RECORDING UNIT AND INK JET RECORDING APPARATUS

(75) Inventors: Takashi Imai, Kawasaki (JP); Shinichi Hakamada, Kawasaki (JP); Kenji Moribe, Fujisawa (JP); Masako Udagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 578 days.

This patent is subject to a terminal disclaimer.

(21) Appl. No.: 11/550,464

(22) Filed: Oct. 18, 2006

(65) Prior Publication Data

US 2007/0097155 A1    May 3, 2007

(30) Foreign Application Priority Data

Oct. 28, 2005    (JP) .................................. 2005-314707

(51) Int. Cl.
*C09D 11/00*    (2006.01)
(52) U.S. Cl. .............................. 523/160; 523/161; 347/1
(58) Field of Classification Search .................. 523/160, 523/161
See application file for complete search history.

(56) References Cited

U.S. PATENT DOCUMENTS

| | | | |
|---|---|---|---|
| 5,085,698 A | 2/1992 | Ma et al. ........................ 106/20 |
| 5,160,370 A | 11/1992 | Suga et al. | |
| 5,160,372 A * | 11/1992 | Matrick ...................... 106/31.43 |
| 5,221,334 A | 6/1993 | Ma et al. ...................... 106/20 D |
| 5,272,201 A | 12/1993 | Ma et al. ........................ 524/505 |
| 5,782,967 A | 7/1998 | Shirota et al. ............... 106/31.58 |
| 5,972,082 A * | 10/1999 | Koyano et al. .............. 106/31.27 |
| 6,036,307 A | 3/2000 | Hakamada et al. ........... 347/106 |
| 6,214,963 B1 | 4/2001 | Noguchi et al. ................ 528/71 |
| 6,368,397 B1 * | 4/2002 | Ichizawa et al. ........... 106/31.65 |

(Continued)

FOREIGN PATENT DOCUMENTS

EP    0 616 017 A2    9/1994

(Continued)

OTHER PUBLICATIONS

Feb. 12, 2010 Chinese Official Action in Chinese Patent Application No. 2006101501370 (with translation).

*Primary Examiner* — Doris Lee
(74) *Attorney, Agent, or Firm* — Fitzpatrick, Cella, Harper & Scinto

(57) ABSTRACT

An aqueous ink comprising a polymer having hydroxyl groups and a pigment, which can provide images excellent in scratch resistance and highlighter resistance and can inhibit the seeping out phenomenon of the polymer and the deterioration of ejection characteristics even when it is stored for a long period of time. The aqueous ink comprises a polymer having hydroxyl groups, a pigment and a water-soluble organic solvent, wherein the water-soluble organic solvent comprises a poor medium for a polymer that is not adsorbed on the pigment (out of the polymer having hydroxyl groups), and wherein when the segment constituting the polymer that is not adsorbed on the pigment (out of the polymer having hydroxyl groups) is comprised of a segment A having hydroxyl groups and a segment B having no hydroxyl group, at least one of the poor medium is a good medium for either one of the segment A and the Segment B.

15 Claims, 4 Drawing Sheets

U.S. PATENT DOCUMENTS

| | | | |
|---|---|---|---|
| 6,398,355 B1 | 6/2002 | Shirota et al. | 347/100 |
| 6,412,940 B1* | 7/2002 | Inoue et al. | 347/101 |
| 6,474,803 B1 | 11/2002 | Shirota et al. | 347/100 |
| 6,511,534 B1* | 1/2003 | Mishina et al. | 106/31.33 |
| 6,552,156 B2 | 4/2003 | Noguchi et al. | 528/71 |
| 6,676,254 B2 | 1/2004 | Nagashima et al. | 347/100 |
| 6,698,876 B2 | 3/2004 | Sato et al. | 347/100 |
| 6,723,137 B1 | 4/2004 | Hakamada et al. | 8/549 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 7,125,111 B2 | 10/2006 | Udagawa et al. | 347/100 |
| 7,141,105 B2 | 11/2006 | Udagawa et al. | 106/31.49 |
| 7,144,449 B2 | 12/2006 | Udagawa et al. | 106/31.15 |
| 7,185,978 B2 | 3/2007 | Nagashima et al. | 347/100 |
| 7,195,340 B2 | 3/2007 | Nagashima et al. | 347/56 |
| 7,208,032 B2 | 4/2007 | Hakamada et al. | 106/31.27 |
| 2002/0032252 A1* | 3/2002 | Ishizuka | 523/160 |
| 2003/0032697 A1* | 2/2003 | Koga et al. | 523/160 |
| 2004/0009294 A1* | 1/2004 | Kuribayashi et al. | 427/212 |
| 2004/0102541 A1* | 5/2004 | Sacoto et al. | 523/160 |
| 2005/0075416 A1* | 4/2005 | Miyabayashi | 523/160 |
| 2005/0088501 A1 | 4/2005 | Nagashima et al. | 347/100 |
| 2005/0204955 A1 | 9/2005 | Nagashima et al. | 106/31.59 |
| 2005/0219341 A1 | 10/2005 | Nito et al. | 347/100 |
| 2006/0007288 A1 | 1/2006 | Takada et al. | 347/100 |
| 2006/0007289 A1 | 1/2006 | Nito et al. | 347/100 |
| 2006/0012657 A1 | 1/2006 | Nagashima et al. | 347/100 |
| 2006/0021545 A1 | 2/2006 | Nagashima et al. | 106/31.27 |
| 2006/0098067 A1 | 5/2006 | Imai et al. | 347/100 |
| 2006/0098068 A1 | 5/2006 | Hakamada et al. | 347/100 |
| 2006/0100311 A1 | 5/2006 | Tokuda et al. | 523/160 |
| 2006/0103704 A1 | 5/2006 | Hakamada et al. | 347/100 |
| 2006/0125895 A1 | 6/2006 | Nito et al. | 347/100 |
| 2006/0192827 A1 | 8/2006 | Takada et al. | 347/100 |
| 2006/0196389 A1 | 9/2006 | Tsuji et al. | 106/31.43 |
| 2006/0234018 A1 | 10/2006 | Nagashima et al. | 428/195.1 |
| 2007/0029522 A1 | 2/2007 | Udagawa et al. | 252/301.16 |
| 2007/0034114 A1 | 2/2007 | Udagawa et al. | 106/31.15 |
| 2007/0097156 A1 | 5/2007 | Udagawa et al. | 347/1 |
| 2007/0112095 A1 | 5/2007 | Moribe et al. | 523/160 |
| 2007/0134451 A1 | 6/2007 | Hakamada et al. | 428/32.38 |
| 2007/0148376 A1 | 6/2007 | Tomioka et al. | 428/32.1 |
| 2007/0188572 A1 | 8/2007 | Takayama et al. | 347/100 |
| 2007/0191508 A1 | 8/2007 | Nakagawa et al. | 523/160 |

FOREIGN PATENT DOCUMENTS

| | | |
|---|---|---|
| EP | 1 291 397 A1 | 3/2003 |
| EP | 1 609 807 A1 | 12/2005 |
| JP | 5-179183 | 7/1993 |
| WO | WO 2004/067287 A1 | 8/2004 |

* cited by examiner

AQUEOUS INK, INK JET RECORDING METHOD, INK CARTRIDGE, RECORDING UNIT AND INK JET RECORDING APPARATUS

BACKGROUND OF THE INVENTION

1. Field of the Invention

The present invention relates to an aqueous ink comprising a polymer and a pigment.

2. Description of the Related Art

It has been known to use a pigment as a coloring material of an ink in order to make excellent the fastness properties, such as light fastness, gas fastness and water fastness, of an image obtained by an ink jet recording method. It has also been known to use in an ink a resin dispersion pigment that is dispersed with a polymer as a dispersant, or a self-dispersible pigment to the surface of which a hydrophilic group is bonded and a water-soluble polymer in order to improve the scratch resistance and highlighter resistance of an image (Japanese Patent Application Laid-Open No. H05-179183).

SUMMARY OF THE INVENTION

The present inventors have carried out a detailed investigation as to inks comprising a resin dispersion pigment with a view toward improving the fastness properties, such as light fastness, gas fastness and water fastness, of an image obtained by an ink jet recording method as well as the scratch resistance and highlighter resistance thereof. As a result, it has been found that the ejection characteristics of the inks are greatly affected by the type or properties of a polymer functioning as a dispersant.

Thus, the present inventors have carried out a further detailed investigation as to polymers used as dispersants for the purpose of making excellent the fastness properties, scratch resistance and highlighter resistance of images as well as the ejection characteristics of inks. As a result, it has been found that an ink in which a pigment is dispersed with a polymer having hydroxyl groups can solve the above-described problems.

However, it has been found that when an ink cartridge stored therein an ink in which a pigment is dispersed with a polymer having hydroxyl groups is installed in an ink jet recording apparatus and then is left to stand for a long period of time without ejecting the ink, the following new technical problem is raised. Namely, it has been found that the polymer in the ink seeps out through ejection orifices of a recording head, adheres in the vicinity of the ejection orifices and then sticks there, whereby the ejection characteristics are deteriorated.

Accordingly, it is an object of the present invention to provide an aqueous ink (hereinafter may also be referred to as "ink") capable of solving the following problems when the aqueous ink comprising a resin dispersion pigment that is dispersed with a polymer having hydroxyl groups as a dispersant. In other words, the object is to provide an aqueous ink that can provide images excellent in scratch resistance and highlighter resistance and can inhibit the seeping out phenomenon of the polymer and the deterioration of ejection characteristics even when it is stored for a long period of time.

Another object of the present invention is to provide an ink cartridge, a recording unit and an ink jet recording method using the above-described aqueous ink.

The above objects can be achieved by the present invention described below. More specifically, an aqueous ink according to the present invention comprises a polymer having hydroxyl groups, a pigment and a water-soluble organic solvent, wherein the water-soluble organic solvent comprises a poor medium for a polymer that is not adsorbed on the pigment out of the polymer having hydroxyl groups, and wherein when a segment constituting the polymer that is not adsorbed on the pigment out of the polymer having hydroxyl groups is comprised of a segment A having hydroxyl groups and a segment B having no hydroxyl group, at least one of the poor medium is a good medium for either one of the segment A and the segment B.

The ink jet recording method according to another embodiment of the present invention is an ink jet recording method comprising ejecting an ink by an ink jet method to conduct recording on a recording medium, wherein the ink is the aqueous ink of the above-described constitution.

The ink cartridge according to a further embodiment of the present invention is an ink cartridge comprising an ink storage portion storing an ink, wherein the ink is the aqueous ink of the above-described constitution.

The recording unit according to a still further embodiment of the present invention is a recording unit comprising an ink storage portion storing an ink and a recording head for ejecting the ink, wherein the ink is the aqueous ink of the above-described constitution.

The ink jet recording apparatus according to a yet still further embodiment of the present invention is an ink jet recording apparatus comprising an ink storage portion storing an ink and a recording head for ejecting the ink, wherein the ink is the aqueous ink of the above-described constitution.

According to the present invention, there can be provided an aqueous ink capable of solving the following problems when using the aqueous ink comprising a resin dispersion pigment that is dispersed with a polymer having hydroxyl groups as a dispersant. In other words, there can be provided an aqueous ink that can provide images excellent in scratch resistance and highlighter resistance and can inhibit the seeping out phenomenon of the polymer and the deterioration of ejection characteristics even when it is stored for a long period of time.

According to another embodiment of the present invention, there can be provided an ink cartridge, a recording unit and an ink jet recording method using the above-described aqueous ink.

Further features of the present invention will become apparent from the following description of exemplary embodiments with reference to the attached drawings.

DESCRIPTION OF THE EMBODIMENTS

The present invention will hereinafter be described in more detail by the best mode for carrying out the invention.

The present inventors have carried out a detailed investigation as to inks comprising a resin dispersion pigment with a view toward improving the scratch resistance and highlighter resistance of images obtained by an ink jet recording method. The inventors have supposed that the ejection characteristics can be improved by enhancing the hydrophilicity of a pigment, and thus carried out an investigation as to the use of a polymer having hydroxyl groups as a dispersant for the resin dispersion pigment further. However, it has been found that when an ink cartridge having stored therein an ink containing a resin dispersion pigment dispersed with a polymer having hydroxyl groups is installed in an ink jet recording apparatus and then is left to stand for a long period of time without ejecting the ink, the following problem is raised. In other words, it has been confirmed that a phenomenon that the polymer in the ink seeps out through ejection orifices of a recording head occurs. Thus, the present inventors have carried out an investigation as to causes of the above phenomenon. As a result, the inventors have concluded that the following phenomenon caused within a nozzle of the recording head is one of the causes. The mechanism with which the polymer seeps out will hereinafter be described in detail with reference to FIGS. 1A, 1B and 1C.

Figure 1A:
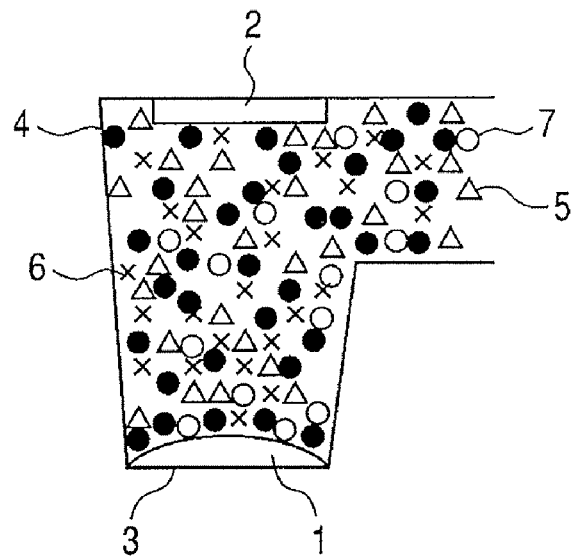
FIGS. 1A, 1B and 1C typically illustrate the condition that the state of an ink changes with time within a nozzle.
Figure 1B:
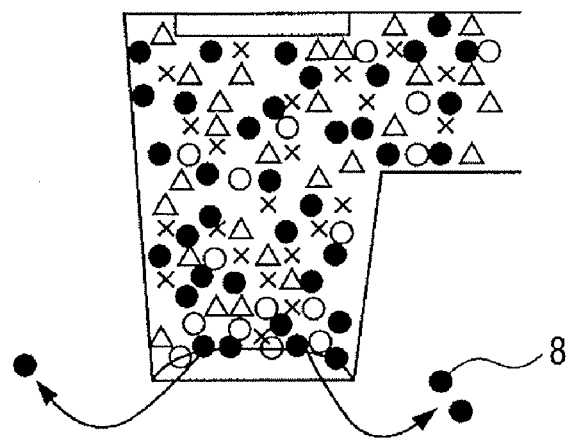
Figure 1C:
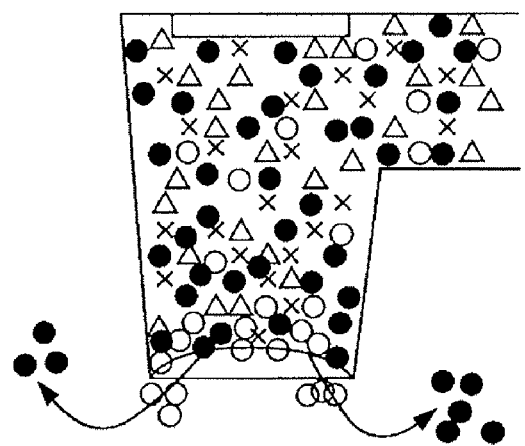

FIGS. 1A, 1B and 1C typically illustrate the condition that the state of an ink containing a resin dispersion pigment dispersed by a polymer having hydroxyl groups changes with time within a nozzle.

FIG. 1A illustrates a state after the ink has been ejected from an ejection orifice 1 by thermal energy applied from a heater 2. As illustrated in FIG. 1A, water molecule 4, pigment particle 5 on which the polymer has been adsorbed, a water-soluble organic solvent 6, and a polymer having hydroxyl groups that is not adsorbed on the pigment (a free polymer 7 having hydroxyl groups) are present within the nozzle in a uniformly dispersed state. Incidentally, in the present invention, a polymer that is not adsorbed on the pigment is referred to as "free polymer", and a polymer having hydroxyl groups in a state not adsorbed on a pigment is referred to as "free polymer having hydroxyl groups".

FIG. 1B illustrates a state after having been left to stand for a certain period of time with the state of FIG. 1A. As illustrated in FIG. 1B, water first evaporates from the ejection orifice 1 within the nozzle with time (water molecules 8 evaporated). When the time has further elapsed, the water molecule 4 within the nozzle transfers in the direction of the ejection orifice 1. At this time, the free polymer 7 having hydroxyl groups, which is forming a hydrogen bond with the water molecule 4, also transfers together with the water molecule 4 in the direction of the ejection orifice 1.

FIG. 1C illustrates a state after the time has still further elapsed. As illustrated in FIG. 1C, the free polymer 7 having hydroxyl groups, which is forming a hydrogen bond with the water molecule 4, seeps out through the ejection orifice 1 and adheres to an orifice face 3 centering on the ejection orifice 1. The free polymer 7 having hydroxyl groups right after having adhered to the orifice face 3 keeps a dissolved state by the bonded water molecule 4. Since the bonded water molecule 4 evaporates with time, however, the free polymer 7 having hydroxyl groups loses its solubility to stick as a deposit on the periphery of the ejection orifice 1.

The phenomenon that the polymer in the ink seeps out through the ejection orifice of the recording head occurs according to the above-described mechanism. As a result, it is considered that the ejection characteristics are deteriorated by the presence of the deposit.

Incidentally, whether all the free polymer having hydroxyl groups present in the ink according to the present invention forms the hydrogen bond with the water molecules or nor is unknown. It is, however, inferred that majority of the polymer having hydroxyl groups is present in the state of forming a hydrogen bond with the water molecule in order to more stably be present in the ink.

As described above, the polymer to cause seeping out is a polymer having hydroxyl groups that is not adsorbed on the pigment, i.e., a free polymer having hydroxyl groups. As a consequence, it is supposed that the deterioration of the ejection characteristics can be inhibited by reducing the content of the free polymer having hydroxyl groups in the ink.

Accordingly, it is supposed that the above-described phenomenon can be inhibited by taking the following inventive arrangement within such a range that the ejection characteristics are not deteriorated and the scratch resistance and highlighter resistance are sufficiently achieved. More specifically, it is supposed that the content of the free polymer having hydroxyl groups in the ink is reduced to the utmost, or the hydrophobicity of a monomer constituting a dispersant is made higher, whereby adsorbability between the pigment and the dispersant is enhanced to prevent the generation of the free polymer having hydroxyl groups to the utmost. However, it is very difficult to actually perform such an arrangement as described above. Thus, the present inventors have carried out an investigation as to means for arranging the above-described phenomenon by devising the formulation of an ink.

As a result, it has been found that the phenomenon that the free polymer having hydroxyl groups seeps out through the ejection orifice can be inhibited by the following constitution. First of all, it is supposed that the water-soluble organic solvent is a poor medium (the details will be described subsequently) for the polymer having hydroxyl groups, and the segment constituting the polymer having hydroxyl groups is composed of a segment A having hydroxyl groups and a segment B having no hydroxyl group. Incidentally, "segment" is defined as a repeating unit which constitutes the polymer. It has been found in this case that when the water-soluble organic solvent comprised of the poor medium which is a good medium (the details will be described subsequently) for either one of the segment A and segment B is contained in an ink, the phenomenon that the free polymer having hydroxyl groups seeps out through the ejection orifice can be inhibited. The reason why the phenomenon that the free polymer having hydroxyl groups seeps out through the ejection orifice can be inhibited is not clearly known. However, the present inventors speculate as described below.

When the water-soluble organic solvent is a good medium for the free polymer having hydroxyl groups, the free polymer having hydroxyl groups is present within a nozzle in a state that it has formed a hydrogen bond with a water molecule even if the water-soluble organic solvent is a poor medium for either one of the segment A and the segment B. As a result, it is supposed that the same phenomenon as illustrated in FIGS. 1A to 1C occurs.

On the other hand, the water-soluble organic solvent is a poor medium for the free polymer having hydroxyl groups, the free polymer having hydroxyl groups transfers in the direction of the heater 2 in FIG. 1 attending on a rapid increase of the proportion of the poor medium caused by the evaporation of water through the ejection orifice, because the free polymer having hydroxyl groups is more stably present. In the present invention, this phenomenon is referred to as "receding phenomenon". As a result, it is supposed that the seeping out phenomenon can be somewhat alleviated.

Figure 2:
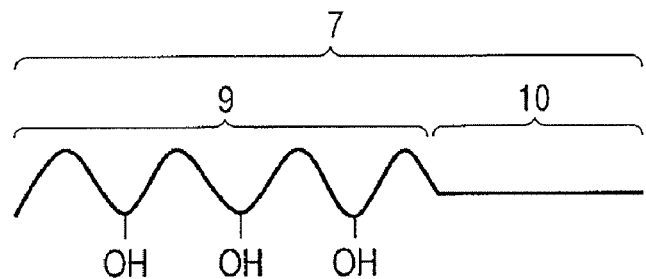
FIG. 2 typically illustrates a free polymer having hydroxyl groups.

The investigation by the present inventors has revealed that the seeping out phenomenon can be sufficiently inhibited only in the following case. It is supposed that the segment constituting the polymer having hydroxyl groups is composed of a segment A having hydroxyl groups ('9' in FIG. 2) and a segment B having no hydroxyl group ('10' in FIG. 2). In this case, it has been found that the seeping out phenomenon can be sufficiently inhibited only when the poor medium is a good medium for either one of the segment A and the segment B.

When the water-soluble organic solvent is a poor medium for the free polymer having hydroxyl groups and is also a poor medium for both segment A and segment B, the rapid increase of the proportion of the poor medium caused by the evaporation of water through the ejection orifice creates an unstable environment for the free polymer having hydroxyl groups. Therefore, part of the free polymer having hydroxyl groups cannot transfer in the direction of the heater (cannot cause the receding phenomenon) and is left in the vicinity of the ejection orifice. As a result, the free polymer having hydroxyl groups left transfers in the direction of the ejection orifice with the transfer of water molecules caused by evaporation thereof to cause the seeping out phenomenon.

On the other hand, when the water-soluble organic solvent is a poor medium for the free polymer having hydroxyl groups and is also a good medium for either one of the segment A and the segment B, the following situation is caused. Namely, the rapid increase of the proportion of the poor medium caused by the evaporation of water through the ejection orifice creates an unstable environment for the free polymer having hydroxyl groups. However, the speed of the change in the environment by the evaporation of water through the ejection orifice is gentle compared with the above-described case where the water-soluble organic solvent is a poor medium for both segment A and segment B. As a result, the free polymer having hydroxyl groups is not left in the vicinity of the ejection orifice and can transfer in the direction of the heater where water is sufficiently present, i.e., the free polymer having hydroxyl groups can stably be present. It is supposed that in the present invention, such a mechanism as described above occurs, so that the seeping out phenomenon can be inhibited.

That is to say, the present inventors have found that it is important to satisfy the following conditions for inhibiting the seeping out phenomenon, thus leading to completion of the present invention. In other words, it is important to select a water-soluble organic solvent capable of developing the receding phenomenon of the free polymer having hydroxyl groups and making control so as not to rapidly cause the receding phenomenon and to add such a solvent in an ink.

Incidentally, the water soluble organic solvent which is a poor medium for the free polymer having hydroxyl groups and is a good medium for either one of the segment A and the segment B, may be used either singly or in any combination thereof. In addition, another water-soluble organic solvent may be used so far as the effect achieved by adding such poor medium is obtained and the objects and effects of the present invention are not impaired. For example, a water-soluble organic solvent, which is a poor medium for the free polymer having hydroxyl groups and is also a poor medium for both segment A and segment B, may also be used.

However, when the water-soluble organic solvent, which is a poor medium for both segment A and segment B, is used in combination, the receding phenomenon may rapidly occur according to the content of such a water-soluble organic solvent. When using polyethylene glycol or the lower alkyl ethers as mentioned below, among water-soluble organic solvents which are poor mediums for both segment A and segment B, the receding phenomenon is apt to occur rapidly. Examples of the lower alkyl ethers include ethylene glycol monomethyl ether, diethylene glycol monoethyl ether and diethylene glycol monobutyl ether. In addition, triethylene glycol monobutyl ether, propylene glycol monobutyl ether and dipropylene glycol monobutyl ether may also be mentioned. The content of these solvents is preferably controlled to 50% or less, more preferably less than 30%, based on the content of the water-soluble organic solvent that is a poor medium for the free polymer having hydroxyl groups and is also a good medium for either one of the segment A and the segment B. The content of polyethylene glycol or such a lower alkyl ether as described above is preferably controlled to 5.0 mass % or less, more preferably 2.0 mass % or less, based on the total mass of the ink.

On the other hand, when a water-soluble organic solvent, which is a poor medium for the free polymer having hydroxyl groups and is also a good medium for both segment A and segment B, is used in combination, the following constitution is preferably used in order to more effectively achieve the effect of the receding phenomenon by the poor medium. More specifically, it is preferable to make the content of the water-soluble organic solvent, which is a poor medium for the free polymer having hydroxyl groups and is also a good medium for either one of the segment A and the segment B, more than the content of the water-soluble organic solvent, which is a good medium for both segment A and segment B.

The poor medium and good medium usable in the present invention vary according to the kind of the polymer. However, examples thereof include the following water-soluble organic solvents. Examples of the water-soluble organic solvent, which is a poor medium for the free polymer having hydroxyl groups and is also a good medium for either one of the segment A and the segment B, include 2-pyrrolidone, N-methyl-2-pyrrolidone and 1,1,1-trimethylolpropane. On the other hand, examples of the water-soluble organic solvent, which is a good medium for both segment A and segment B, include glycerol and diethylene glycol. Examples of the water-soluble organic solvent, which is a poor medium for both segment A and segment B, include polyethylene glycol having an average molecular weight of 1,000.

No particular limitation is imposed on the content (mass %) of the water-soluble organic solvent, which is a poor medium for the free polymer having hydroxyl groups and is also a good medium for either one of the segment A and the segment B, so far as the phenomenon that the free polymer having hydroxyl groups seeps out through the ejection orifice can be inhibited. In the present invention, the content is preferably 10 times or more, more preferably 18 times or more, particularly preferably 27 times or more, as much as the content (mass %) of the free polymer having hydroxyl groups based on the total mass of the ink. A polymer high in hydrophilicity like the polymer having hydroxyl groups is easy to be desorbed from the surface of a pigment high in hydrophobicity. Therefore, the content (mass %) of the water-soluble organic solvent, which is a poor medium for the free polymer having hydroxyl groups, based on the total mass of the ink is preferably from 9 times or more to 17 times or less, more preferably from 9 times or more to 15 times or less, as much as the content (mass %) of the polymer having hydroxyl groups based on the total mass of the ink.

<Ink>

The components constituting an ink according to the present invention will hereinafter be described.

(Poor Medium and Good Medium)

In the present invention, a water-soluble organic solvent low in solubility to the polymer and a water-soluble organic solvent high in solubility to the polymer are defined as "poor medium" and "good medium", respectively. More specifically, the poor medium and the good medium can be determined by the following method.

To an aqueous solution of a water-soluble organic solvent diluted with water to 50 mass %, is added 0.5 g of a 10 mass % aqueous solution of a polymer to be determined dropwise, and the solution is left to stand for 4 days at room temperature in a closed state. Thereafter, the state after having been left to stand is compared with the initial state to determine the water-soluble organic solvent to be a poor medium where the solution becomes turbid, or the presence of an oily substance or deposit is observed, or to be a good medium where the solution undergoes no change.

Incidentally, the determination of a poor medium or good medium for the segment A and segment B constituting the free polymer having hydroxyl groups can be made in the same manner as described above. However, since the segment A and segment B are copolymers, it is necessary to separately prepare the segment A and segment B constituting the free polymer having hydroxyl groups to make the determination for the purpose of making the determination of a poor medium or good medium for each segment.

Incidentally, when a poor medium or a good medium for plural polymers contained in a commercially available ink containing plural polymers or the like is determined, the determination is conducted by the following method. After a free polymer having hydroxyl groups is first extracted by centrifugation or the like, the free polymer having hydroxyl groups is fractionated by means of gas chromatography or the like. Thereafter, whether a water-soluble organic solvent is a poor medium or a good medium for the free polymer having hydroxyl groups is determined. With respect to the free polymer having hydroxyl groups, the monomer components constituting the polymer are analyzed by means of pyrolysis gas chromatography or the like. The segment A and the segment B are separately prepared on the basis of the analyzed result thus obtained to determine whether the water-soluble organic solvent, which has been determined to be a poor medium for the free polymer having hydroxyl groups, is a poor medium or a good medium for each segment.

(Aqueous Medium)

In the inks according to the present invention, an aqueous medium, which is water, or a mixed solvent of water and any of various water-soluble organic solvents, may be used.

Incidentally, it is necessary to contain in the ink a water-soluble organic solvent, which is a poor medium for the free polymer and is also a good medium for either one of the segment A and the segment B. However, such a solvent may be used in combination with any other water-soluble organic solvent, for example, a water-soluble organic solvent that is a poor medium for the free polymer and is also a poor medium for both segment A and segment B. When the other water-soluble organic solvent is used in combination, however, it is necessary to take such a relation of quantitative proportion that the receding phenomenon can be developed, even when an ink cartridge stored therein an ink containing such solvents is installed in an ink jet recording apparatus, and the apparatus is then left to stand for a while in a state that the ink cartridge has been installed in a recording head. Incidentally, water-soluble organic solvents usable in the ink according to the present invention are not limited to the following solvents because the relation of a poor medium and a good medium varies according to the polymer having hydroxyl groups.

No particular limitation is imposed on the water-soluble organic solvent so far as it is soluble in water, and the following solvents may be used.

Polyhydric alcohols, in which hydroxyl groups are bonded to saturated carbon atoms, such as 1,5-pentanediol, 1,2-hexanediol, 1,6-hexanediol, 1,2,6-hexanetriol and 1,1,1-trimethylolpropane; monohydric alkyl alcohols having 1 to 4 carbon atoms, such as ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene group of which has 2 to 6 carbon atoms, such as ethylene glycol, propylene glycol, butylene glycol, triethylene glycol and thiodiglycol; lower alkyl ether acetates such as polyethylene glycol monomethyl ether acetate; bishydroxyethyl sulfone; lower alkyl glycol ethers such as ethylene glycol monomethyl (or ethyl, butyl) ether, diethylene glycol monomethyl (or ethyl, butyl) ether and triethylene glycol monomethyl (or ethyl, butyl) ether; lower dialkyl glycol ethers such as triethylene glycol dimethyl (or ethyl) ether and tetraethylene glycol dimethyl (or ethyl) ether; alkanolamines such as monoethanolamine, diethanolamine and triethanolamine; sulfolane; N-methyl-2-pyrrolidone; 2-pyrrolidone; 1,3-dimethyl-2-imidazolidinone.

In the present invention, it is particularly preferable that the ink contains polyethylene glycol having an average molecular weight of from 600 or more to 1,500 or less, since ejection characteristics, particularly, ejection characteristics when the ink is continuously ejected, can be made excellent. In particular, the content of polyethylene glycol having an average molecular weight of from 600 or more to 1,500 or less is preferably 0.5 times or more as much as the content of the pigment (solid content) in the ink.

The content (mass %) of the water-soluble organic solvents including the water-soluble organic solvent, which is a poor medium for the free polymer having hydroxyl groups and is also a good medium for either one of the segment A and the segment B, is preferably as follows. More specifically, the content is preferably from 3.0 mass % or more to 50.0 mass % or less, more preferably from 7.0 mass % or more to 50.0 mass % or less, based on the total mass of the ink.

As the water, it is preferable to use deionized water (ion-exchanged water). The content (mass %) of water is preferably from 40.0 mass % or more to 95.0 mass % or less based on the total mass of the ink.

(Polymer having Hydroxyl Groups)

It is essential for the ink according to the present invention to contain a polymer having hydroxyl groups. Polymers having hydroxyl groups include acrylic ester polymers obtained by copolymerizing acrylic ester monomers, for example, polymers obtained by copolymerizing a monomer having hydroxyl group(s) with a part of acrylic ester monomers.

Examples of the monomer having hydroxyl group(s) include 2-hydroxyethyl (meth)acrylate, hydroxypropyl (meth)acrylate, polyethylene glycol mono(meth)acrylate and polypropylene glycol mono(meth)acrylate.

As the monomer copolymerized with the monomer having hydroxyl group(s), there may be used that which are commonly used. Examples of the acrylic ester monomer include methyl (meth)acrylate, ethyl (meth)acrylate, n-butyl (meth)acrylate, 2-ethylhexyl (meth)acrylate and cyclohexyl (meth)acrylate. Besides the acrylic ester monomers, any monomer having a double bond copolymerizable with the monomer having hydroxyl group(s) may also be used. Examples thereof include a styrene monomer, vinyl acetate monomer and 1,3-butadiene.

As the polymer having hydroxyl groups, there may also be used a polymer obtained by saponifying a vinyl acetate-acrylic ester polymer obtained by copolymerizing an acrylic ester monomer and a vinyl acetate monomer with a strong base such as sodium hydroxide, i.e., a polyvinyl alcohol type polymer.

No particular limitation is imposed on the form of the polymer so far as the scratch resistance and highlighter resistance of an image as well as the ejection characteristics of the ink can be made excellent, which is the fundamental object to be achieved by the addition of the polymer having hydroxyl groups into an ink, and any polymer of linear, branched, random and block copolymers may be used. In order to more effectively cause the receding phenomenon by the poor solvent, however, the molecular weight of the segment having hydroxyl groups is preferably 20,000 or less.

When the polymer having hydroxyl groups is a copolymer composed of a segment having hydroxyl groups and a segment having no hydroxyl group, such a polymer is preferably a block copolymer, more preferably a block copolymer in which a monomer having hydroxyl group(s) is present at a terminal of the polymer, because the adsorbability of the polymer having hydroxyl groups on the surface of the pigment is enhanced when the hydrophobic portion of the polymer having hydroxyl groups, which is adsorbed on the surface of the pigment, is concentrated on the terminal.

No particular limitation is imposed on the content (mass %) of the polymer having hydroxyl groups in the ink according to the present invention so far as the scratch resistance and highlighter resistance of an image as well as the ejection characteristics of the ink can be made excellent, which is the fundamental object. In the present invention, however, the content of the polymer having hydroxyl groups is preferably lessened to the utmost in order to lessen the content of the free polymer having hydroxyl groups, which forms the cause of the seeping out phenomenon, to the utmost. Accordingly, the content (mass %) of the polymer having hydroxyl groups in the ink is preferably from 5.0% or more to 100.0% or less, more preferably from 7.0% or more to less than 20.0% based on the total mass of the ink when the content (mass %) of the pigment in the ink is regarded as 100 based on the total mass of the ink. The content (mass %) of the polymer having hydroxyl groups is preferably less than 1.0 mass %, more preferably less than 0.8 mass % based on the total mass of the ink.

Incidentally, it has been confirmed that the effect by the poor medium as described above is not a phenomenon peculiar to an ink containing the resin dispersion pigment, and it is also effective to an ink containing a self-dispersible pigment and a polymer having hydroxyl groups as well as an ink containing a dye and a polymer having hydroxyl groups. However, as described above, the polymer having hydroxyl groups is very high in hydrophilicity. Accordingly, in order to make the scratch resistance and highlighter resistance excellent, which is the fundamental object of the present invention, it is preferable to employ an ink using as a coloring material the resin dispersion pigment, in which the polymer having hydroxyl groups is adsorbed on the pigment, not an ink into which the polymer is only added.

In the present invention, the content of the free polymer having hydroxyl groups in the ink somewhat varies according to the structure of the polymer and the pigment used together with the polymer, and the like. In this case, however, the content may be suitably controlled by ultrafiltration or the like.

(Content of Free Polymer having Hydroxyl Groups in Ink)

In the present invention, the content of the free polymer having hydroxyl groups in the ink can be measured in accordance with the following method. The present invention is not limited to the following method, and a value measured by any other method may be used.

An ink is centrifuged under conditions of 400,000 G and 16 hours, 95 mass % of a liquid in a supernatant portion is taken out. Thereafter, the resultant liquid is subjected to acid dipping to take out a free polymer. The resultant free polymer is then dried to solid to determine the amount of the solid matter. The content of the free polymer based on the total mass of the ink is then found from the proportion to the charged amount. In this method, fine pigment particles may be contained in the liquid of the supernatant portion taken out after the centrifugation under the above-described conditions in some cases. In the present invention, however, the solid matter obtained by conducting the acid dipping by the above-described procedure is substantially regarded as solid matter of the free polymer because the amount of the pigment contained is very small. When the polymer in the ink is comprised of only the polymer having hydroxyl groups, the solid matter of this free polymer is solid matter of the free polymer having hydroxyl groups, and the content (mass %) of the free polymer having hydroxyl groups based on the total mass of the ink is found from this value.

Incidentally, the ink may contain two or more free polymers, for example, the free polymer having hydroxyl groups and a free polymer having no hydroxyl group. In such a case, it is necessary to make the following arrangement in order to determine the content of the free polymer having hydroxyl groups. Namely, the polymer having hydroxyl groups is taken out by using MALDI-TOF/MS (a combination of matrix assisted laser desorption ionization and time-of-flight mass spectrometry), arranging the acid dipping conditions or conducting GPC. The obtained polymer is subjected to component analysis as to monomers constituting the polymer by means of $^{13}$C-NMR, gas chromatography and/or the like. An 1 mass % aqueous solution of a polymer having the same structure as the polymer contained in the ink (standard sample) is prepared on the basis of this analytical result. Thereafter, an aqueous solution containing 1 mass % of the free polymer obtained above and the standard sample are subjected to infrared absorption spectrometry under the same conditions. From the result of the infrared absorption spectrometry as to the standard sample and the aqueous solution containing the free polymer, mass conversion is conducted to find the content (mass %) of the free polymer having hydroxyl groups based on the total mass of the ink.

(Pigment)

Examples of pigments usable in the inks according to the present invention include carbon black and organic pigments. The content (mass %) of the pigment is preferably from 0.1 mass % or more to 10.0 mass % or less based on the total mass of the ink.

[Carbon Black]

Examples of usable carbon black include carbon black pigments such as furnace black, lamp black, acetylene black and channel black. It goes without saying that carbon black pigments are not limited to the following pigments.

As specific examples thereof, may be mentioned Raven: 1170, 1190 ULTRA-II, 1200, 1255, 1500, 2000, 3500, 5000, 5250, 5750 and 7000 (all, products of Columbian Carbon Japan Limited); Black Pearls L, Regal: 330R, 400R and 660R, Mogul L, Monarch: 700, 800, 880, 900, 1000, 1100, 1300 and 1400, and Valcan XC-72R (all, products of CABOT CO.); Color Black: FW1, FW2, FW2V, FW18, FW200, S150, S160 and S170, Printex: 35, U, V, 140U and 140V, and Special Black: 4, 4A, 5 and 6 (all, products of Degussa AG); and No. 25, No. 33, No. 40, No. 47, No. 52, No. 900, No. 2300, MCF-88, MA7, MA8, MA100 and MA600 (all, products of MITSUBISHI CHEMICAL CORPORATION).

Besides the above pigments, any carbon black conventionally known may be used. Magnetic fine particles such as magnetite and ferrite, titanium black, and the like may also be used as black pigments.

[Organic Pigment]

The organic pigments specifically include the following pigments, such as insoluble azo pigments such as Toluidine Red, Toluidine Maroon, Hansa Yellow, Benzidine Yellow and Pyrazolone Red; soluble azo pigments such as Lithol Red, Helio Bordeaux, Pigment Scarlet and Permanent Red 2B; derivatives from vat dyes, such as alizarin, indanthron and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange and Benzimidazolone Red; pyranthrone pigments such as Pyranthrone Red and Pyranthrone Orange; indigo pigments; condensed azo pigments; thioindigo pigments; Flavanthrone Yellow; Acylamide Yellow; Quinophthalone Yellow; Nickel Azo Yellow; Copper Azomethine Yellow; Perinone Orange; Anthrone Orange; Dianthraquinonyl Red; Dioxazine Violet; etc.

When organic pigments are indicated by COLOR INDEX (C.I.) numbers, the following pigments may be exemplified. It goes without saying that conventionally known organic pigments may also be used in addition to the following pigments.

C.I. Pigment Yellow: 12, 13, 14, 17, 20, 24, 74, 83, 86, 93, 109, 110, 117, 120, 125, 128, 137, 138, 147, 148, 151, 153, 154, 166 and 168; C.I. Pigment Orange: 16, 36, 43, 51, 55, 59 and 61; C.I. Pigment Red: 9, 48, 49, 52, 53, 57, 97, 122, 123, 149, 168, 175, 176, 177, 180, 192, 215, 216, 217, 220, 223, 224, 226, 227, 228, 238 and 240; C.I. Pigment Violet: 19, 23, 29, 30, 37, 40 and 50; C.I. Pigment Blue: 15, 15:3, 15:1, 15:4, 15:6, 22, 60 and 64; C.I. Pigment Green: 7 and 36; and C.I. Pigment Brown 23, 25 and 26.

(Dispersant)

In the inks according to the present invention, it is essential to use the polymer having hydroxyl groups as a dispersant in consideration of scratch resistance, highlighter resistance and ejection characteristics. Further, any other polymer may be used as a dispersant in the inks according to the present invention so far as the effect by adding them is achieved, and the objects and effects of the present invention are not impaired.

As another dispersant, is preferably used that capable of stably dispersing the pigment in an aqueous medium by an action of an anionic group. For example, the following dispersants may be used.

Specific examples thereof include styrene-acrylic acid copolymers, styrene-acrylic acid-alkyl acrylate terpolymers and salts thereof; styrene-maleic acid copolymers, styrene-maleic acid-alkyl acrylate terpolymers and salts thereof; styrene-methacrylic acid copolymers, styrene-methacrylic acid-alkyl acrylate terpolymers and salts thereof; styrene-maleic acid half ester copolymers, vinylnaphthalene-acrylic acid copolymers, vinylnaphthalene-maleic acid copolymers, styrene-maleic anhydride-maleic acid half ester terpolymers and salts thereof.

The dispersant used in the present invention preferably has a weight average molecular weight ranging from 1,000 or more to 30,000 or less, more preferably from 3,000 or more to 15,000 or less, particularly preferably from 8,000 or more to 14,000 or less.

(Other Additives)

Besides the above components, a surfactant, an antifoaming agent, a preservative, a mildewproofing agent and the like may be added to the inks used in the present invention, not to mention the addition of a humectant, as needed, to obtain an ink having desired physical properties.

When the resin dispersion pigment is used as a coloring material like the present invention, however, the surfactant tends to be adsorbed on the surface of the pigment. Therefore, when a polymer high in hydrophilicity and easy to be desorbed from the surface of the pigment like the polymer having hydroxyl groups is used as a dispersant, it is preferable to lessen the content of the surfactant in the ink to the utmost. Specifically, the content (mass %) of the surfactant in the ink is preferably 25% or less, more preferably 12.5% or less, when the content (mass %) of the pigment (solid content) in the ink is regarded as 100.

<Ink Jet Recording Method, Ink Cartridge, Recording Unit and Ink Jet Recording Apparatus>

Figure 3:
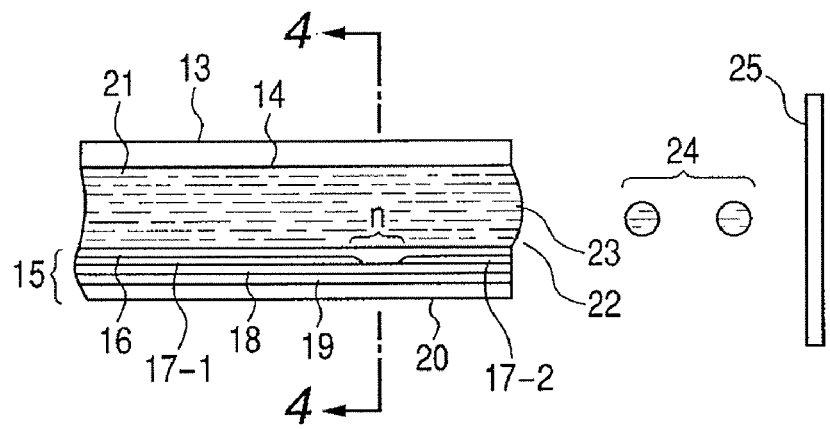
FIG. 3 is a longitudinal cross-sectional view illustrating a recording head.
Figure 4:
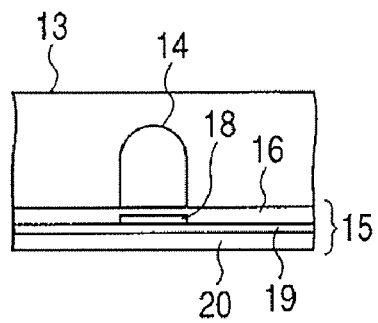
FIG. 4 is a transverse cross-sectional view of the recording head.

An exemplary ink jet recording apparatus will hereinafter be described. First of all, an exemplary construction of a recording head, which is a main component of the ink jet recording apparatus making good use of thermal energy is shown in FIG. 3 and FIG. 4. FIG. 3 is a cross-sectional view of a recording head 13 taken along the flow path of ink, and FIG. 4 is a cross-sectional view taken along line 4-4 in FIG. 3. The recording head 13 is formed by a member having a flow path (nozzle) 14, through which an ink is passed, and a heating element substrate 15. The heating element substrate 15 is composed of a protective layer 16, electrodes 17-1 and 17-2, a heating resistor layer 18, a heat accumulating layer 19 and a substrate 20.

When pulsed electric signals are applied to the electrodes 17-1 and 17-2 of the recording head 13, the heating element substrate 15 rapidly generates heat at the region shown by 'n' to form bubbles in an ink 21 which is in contact with this region. A meniscus 23 of the ink is projected by the pressure of the bubbles, and the ink 21 is ejected from an ejection orifice 22 through the nozzle 14 toward a recording medium 25.

Figure 5:
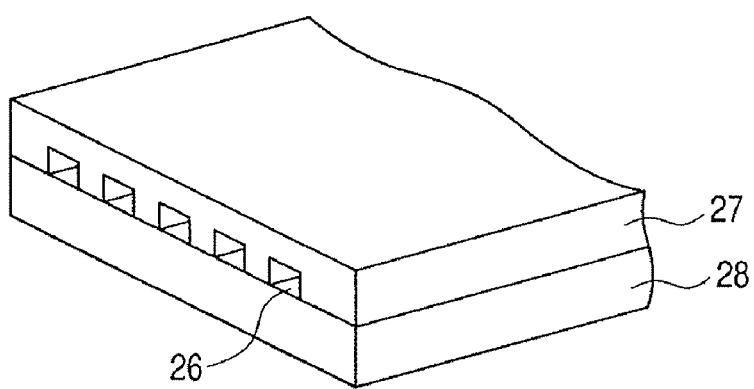
FIG. 5 is a perspective view of a multi-head composed of an array of a number of recording heads as shown in FIG. 3.

FIG. 5 illustrates an appearance of a multi-head composed of an array of a number of heads as shown in FIG. 3. The multi-head is composed of a glass plate 27 having a number of nozzles 26 and a recording head 28 similar to that described in FIG. 3.

Figure 6:
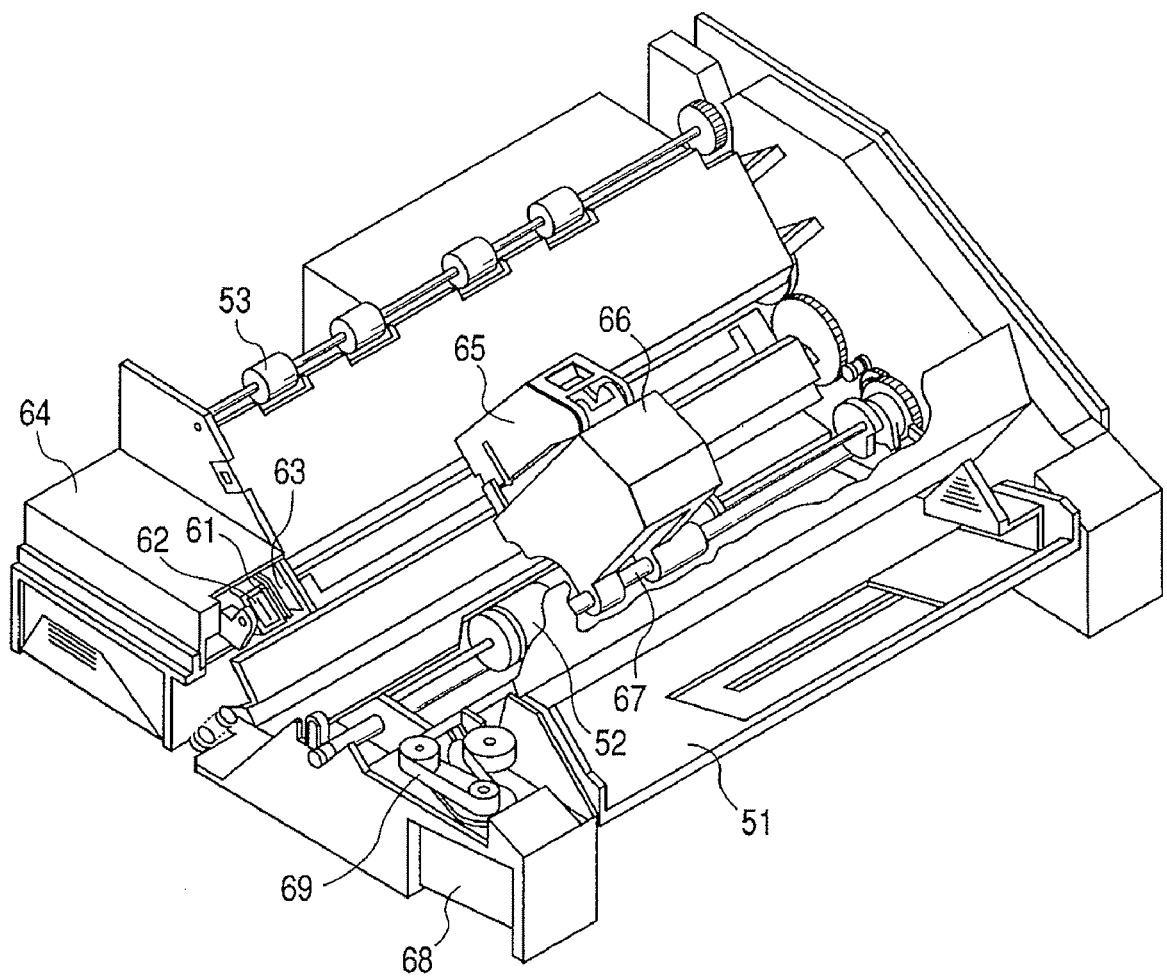
FIG. 6 is a perspective view illustrating an exemplary ink jet recording apparatus.

FIG. 6 is a perspective view illustrating an exemplary ink jet recording apparatus in which a recording head has been incorporated. A blade 61 is a wiping member, one end of which is a stationary end held by a blade-holding member to form a cantilever. The blade 61 is arranged at a position adjacent to a region, in which a recording head 65 operates, and is held in a form protruding into the course through which the recording head 65 is moved.

Reference numeral 62 indicates a cap for the face of ejection orifices of the recording head 65, which is provided at a home position adjacent to the blade 61, and is so constructed that it moves in a direction perpendicular to a direction in which the recording head 65 is moved, and comes into contact with the face of the ejection orifices to cap it. Reference numeral 63 denotes an ink absorbing member provided adjoiningly to the blade 61 and, similar to the blade 61, held in a form protruding into the course through which the recording head 65 is moved. An ejection-recovery portion 64 is constructed by the blade 61, cap 62 and ink absorbing member 63. Water, dust and/or the like are removed from the face of the ink-ejecting orifices by the blade 61 and ink absorbing member 63.

Reference numeral 65 designates the recording head having an ejection-energy-generating means and serving to eject the ink on to a recording medium set in an opposing relation to the ejection orifice face provided with the ejection orifices to conduct recording. Reference numeral 66 indicates a carriage on which the recording head 65 is mounted so that the recording head 65 can be moved. The carriage 66 is slidably interlocked with a guide shaft 67 and is connected (not illustrated) at its part to a belt 69 driven by a motor 68. Thus, the carriage 66 can be moved along the guide shaft 67 and hence, the recording head 65 can be moved from a recording region to a region adjacent thereto.

Reference numerals 51 and 52 denote a feeding part from which the recording medium is inserted, and feed rollers driven by a motor (not illustrated), respectively. With such a construction, the recording medium is fed to the position opposite to the ejection orifice face of the recording head 65, and discharged from a discharge section provided with discharge rollers 53 with the progress of recording. The cap 62 in the ejection-recovery portion 64 is receded from the path of motion of the recording head 65 when the recording head 65 is returned to its home position after completion of recording by the recording head 65, and the blade 61 remains protruded into the path of motion. As a result, the ejection orifice face of the recording head 65 is wiped.

When the cap 62 comes into contact with the ejection orifice face of the recording head 65 to cap it, the cap 62 is moved so as to protrude into the path of motion of the recording head 65. When the recording head 65 is moved from its home position to the position at which recording is started, the cap 62 and blade 61 are at the same positions as the positions for the wiping as described above. As a result, the ejection orifice face of the recording head 65 is also wiped at the time of this movement. The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection orifice face is wiped in accordance with this movement.

Figure 7:
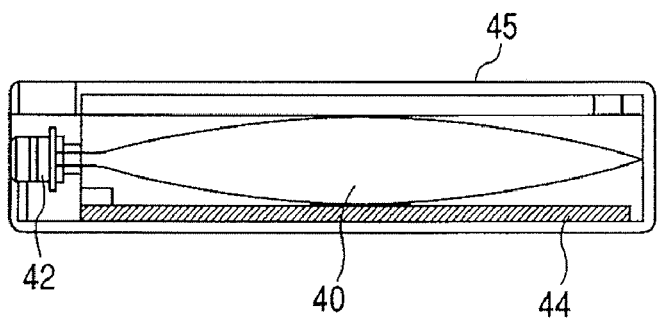
FIG. 7 is a longitudinal cross-sectional view illustrating an ink cartridge.

FIG. 7 illustrates an exemplary ink cartridge in which an ink to be fed to a recording head through an ink-feeding member, for example, a tube is stored. Here, reference numeral 40 designates an ink storage portion storing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the recording head. Reference numeral 44 indicates an absorbing member for receiving a waste ink.

Figure 8:
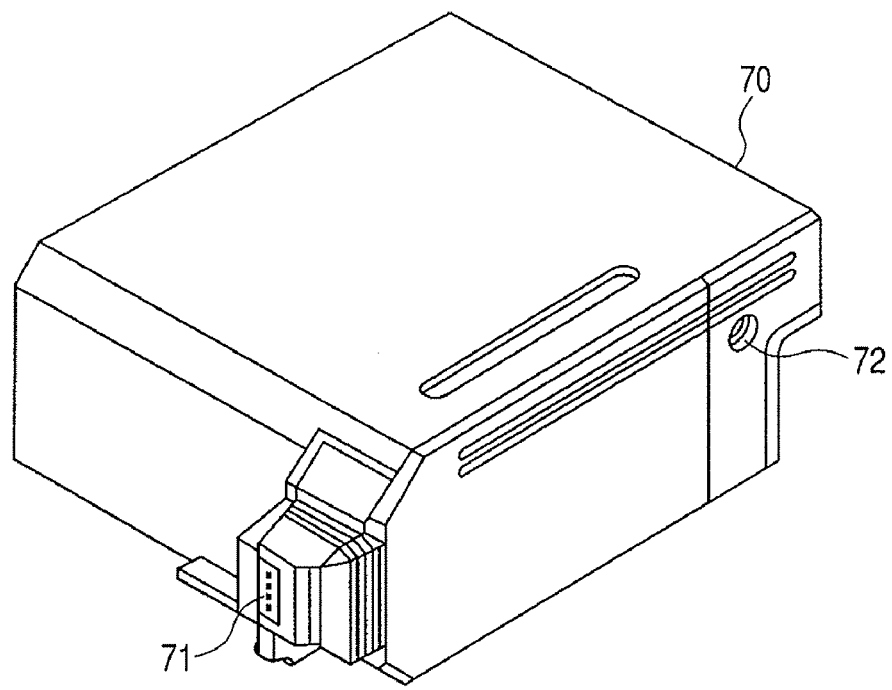
FIG. 8 is a perspective view illustrating an exemplary recording unit.

The ink jet recording apparatus are not limited to the apparatus in which the recording head and the ink cartridge are separately provided. Therefore, an apparatus in which these members are integrally formed as shown in FIG. 8 may also be preferably used. In FIG. 8, reference numeral 70 designates a recording unit, in the interior of which an ink storage portion storing an ink, for example, an ink absorbing member, is contained, and the ink in the ink absorbing member is ejected in the form of ink droplets through a recording head 71 having a plurality of ejection orifices. The ink storage portion may be constructed by a bag for the ink, in the interior of which a spring or the like is provided, without using the ink absorbing member. Reference numeral 72 indicates an air passage for communicating the interior of the recording unit 70 with the atmosphere. This recording unit 70 is used in place of the recording head 65 shown in FIG. 6, and is detachably installed on the carriage 66.

Figure 9:
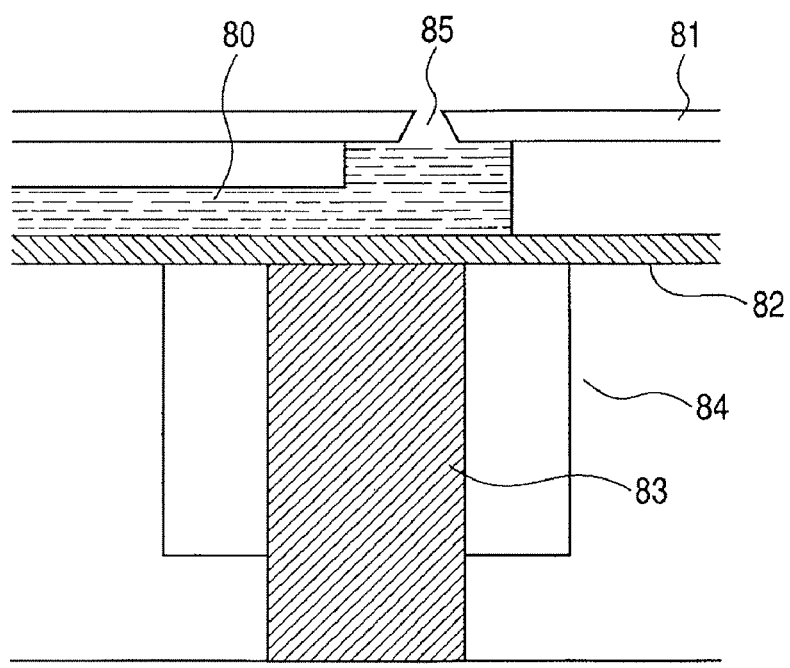
FIG. 9 typically illustrates the construction of an exemplary recording head.

An ink jet recording apparatus making good use of mechanical energy will now be described. The apparatus is equipped with a nozzle-forming substrate having a plurality of nozzles, pressure-generating devices composed of a piezoelectric material and an electric conductive material, and an ink filled around the pressure-generating devices and features a recording head in which the pressure-generating devices are changed by applying a voltage to eject droplets of the ink from ejection orifices. FIG. 9 typically illustrates an example of the construction of the recording head. The recording head is constructed by an ink flow path 80 communicating with an ink chamber, an orifice plate 81, a vibration plate 82 for applying a pressure to the ink, a piezoelectric element 83 bonded to the vibration plate 82 undergoing a change according to an electric signal, and a substrate 84 adapted to support and fix the orifice plate 81, the vibration plate 82 and the like thereon. The vibration plate 82 bonded to the piezoelectric element 83 is deformed by strain stress generated by applying a pulsed voltage to the piezoelectric element 83 to pressurize the ink in the ink flow path 80, thereby ejecting ink droplets from the ejection orifice 85 of the orifice plate 81. Such a recording head can be used by incorporating it into an ink jet recording apparatus similar to that illustrated in FIG. 6.

EXAMPLES

The present invention will hereinafter be described more specifically by the following Examples and Comparative Examples. However, the present invention is not limited by these examples so far as the subject matter of the present invention is not overstepped. Incidentally, all designations of "part" or "parts" and "%" as will be used in the following examples mean part or parts by mass and mass % unless expressly noted.

<Preparation of Pigment Dispersion Solution>

In the preparation of the following pigment dispersion solutions, the following carbon black and polymers were used. However, the present invention is not limited thereto.

Carbon black: one having a specific surface area of 210 $m^2/g$ and a DBP oil absorption of 74 ml/100 g.

Polymer A: a polymer obtained by neutralizing poly(2-hydroxyethyl methacrylate)-b-poly(styrene-co-acrylic acid) (compositional (molar) ratio: 20:60:20) having a weight average molecular weight of 8,000 with a 10 mass % aqueous solution of potassium hydroxide.

Polymer B: a polymer obtained by neutralizing poly(benzyl methacrylate-co-acrylic acid) (compositional (molar) ratio: 70:30) having a weight average molecular weight of 14,000 with a 10 mass % aqueous solution of potassium hydroxide.

(Preparation of Black Pigment Dispersion Solution 1)

Ten parts of carbon black, 2 parts of Polymer A and 88 parts of ion-exchanged water were mixed and dispersed for 3 hours by means of a batch type vertical sand mill. The resultant dispersion solution was centrifuged, thereby removing coarse particles, and then filtered under pressure through a microfilter (product of Fuji Photo Film Co., Ltd.) having a pore size of 3.0 μm, thereby preparing Resin Dispersion Black Pigment 1. Water was added to Resin Dispersion Black Pigment 1 to disperse the pigment so as to give a pigment concentration of 10 mass %, thereby preparing a dispersion solution to obtain Black Pigment Dispersion Solution 1 in accordance with the above-described process. The resultant Black Pigment Dispersion Solution 1 was subjected to ultrafiltration to adjust the content of the free polymer having hydroxyl groups. The mass ratio (pigment:Polymer A) of the content of the pigment to the content of Polymer A in Black Pigment Dispersion Solution 1 was 100:19.

(Preparation of Black Pigment Dispersion Solution 2)

Ten parts of carbon black, 2 parts of Polymer A, 2 parts of Polymer B and 86 parts of ion-exchanged water were mixed and dispersed for 3 hours by means of a batch type vertical sand mill. The resultant dispersion solution was centrifuged, thereby removing coarse particles, and then filtered under pressure through a microfilter (product of Fuji Photo Film Co., Ltd.) having a pore size of 3.0 μm, thereby preparing Resin Dispersion Black Pigment 2. Water was added to Resin Dispersion Black Pigment 2 to disperse the pigment so as to give a pigment concentration of 10 mass %, thereby preparing a dispersion solution to obtain Black Pigment Dispersion Solution 2 in accordance with the above-described process. The resultant Black Pigment Dispersion Solution 2 was subjected to ultrafiltration to adjust the content of the free polymer having hydroxyl groups. In order to find the mass ratio of the content of the pigment to the content of Polymer A in Black Pigment Dispersion Solution 2, the following process was performed. After Black Pigment Dispersion Solution 2 obtained above was dried to solid, the solid was dissolved in tetrahydrofuran to obtain a solution. Thereafter, the resultant solution was filtered under pressure through a microfilter (product of Fuji Photo Film Co., Ltd.) having a pore size of 3.0 μm to separate the solution into the pigment and a solution containing the polymers. The solution containing the polymers was subjected to GPC (gel permeation chromatography) to separately take out Polymer A and Polymer B. The mass ratio (pigment:Polymer A) of the content of the pigment to the content of Polymer A in Black Pigment Dispersion Solution 2 was 100:18.

(Preparation of Black Pigment Dispersion Solution 3)

Ten parts of carbon black, 2 parts of Polymer A and 88 parts of ion-exchanged water were mixed and dispersed for 3 hours by means of a batch type vertical sand mill. The resultant dispersion solution was centrifuged, thereby removing coarse particles, and then filtered under pressure through a microfilter (product of Fuji Photo Film Co., Ltd.) having a pore size of 3.0 μm, thereby preparing Resin Dispersion Black Pigment 3. Water was added to Resin Dispersion Black Pigment 3 to disperse the pigment so as to give a pigment concentration of 10 mass %, thereby preparing a dispersion solution to obtain Black Pigment Dispersion Solution 3 in accordance with the above-described process. The resultant Black Pigment Dispersion Solution 3 was subjected to ultrafiltration to adjust the content of the free polymer having hydroxyl groups. The mass ratio (pigment:Polymer A) of the content of the pigment to the content of Polymer A in Black Pigment Dispersion Solution 3 was 100:17.

(Preparation of Black Pigment Dispersion Solution 4)

Ten parts of carbon black, 3 parts of Polymer A and 87 parts of ion-exchanged water were mixed and dispersed for 3 hours by means of a batch type vertical sand mill. The resultant dispersion solution was centrifuged, thereby removing coarse particles, and then filtered under pressure through a microfilter (product of Fuji Photo Film Co., Ltd.) having a pore size of 3.0 μm, thereby preparing Resin Dispersion Black Pigment 4. Water was added to Resin Dispersion Black Pigment 4 to disperse the pigment so as to give a pigment concentration of 10 mass %, thereby preparing a dispersion solution to obtain Black Pigment Dispersion Solution 4 in accordance with the above-described process. The resultant Black Pigment Dispersion Solution 4 was subjected to ultrafiltration under the same conditions as in Black Pigment Dispersion Solution 1 to adjust the content of the free polymer having hydroxyl groups. The mass ratio (pigment:Polymer A) of the content of the pigment to the content of Polymer A in Black Pigment Dispersion Solution 4 was 100:20.

<Preparation of Ink>

After the components shown in the following Table 1 and Table 2 were mixed and sufficiently stirred, the resultant respective mixtures were filtered under pressure through a microfilter (product of Fuji Photo Film Co., Ltd.) having a pore size of 1.0 μm, thereby preparing Inks 1 to 14.

<Quantitative Determination of Free Polymer having Hyroxyl Groups>

The content (mass %) of the free polymer having hydroxyl groups in each ink was determined in accordance with the following method. The results are shown in Table 1 and Table 2.

The ink was centrifuged under conditions of 400,000 G and 16 hours, and 95 mass % of the liquid in the supernatant portion was taken out. Thereafter, the resultant liquid was subjected to acid dipping to take out the free polymer. The resultant free polymer was dried to solids, and the amount of the solid was determined. The content of the free polymer based on the total mass of the ink was then found from the proportion to the charged amount.

Incidentally, with respect to Ink 2 containing 2 polymers in the ink, the content of the free polymer having hydroxyl groups in the ink was determined by performing the following process in addition to the above-described procedure. Namely, the structure of Polymer A was determined by a method known per se in the art, and a 1 mass % aqueous solution of Polymer A (standard sample) was prepared. Thereafter, an aqueous solution containing 1 mass % of the free polymer obtained above and the standard sample were subjected to infrared absorption spectrometry under the same conditions. From the result of the infrared absorption spectrometry as to the standard sample and the aqueous solution containing the free polymer, mass conversion was conducted to find the content (mass %) of the free polymer having hydroxyl groups based on the total mass of the ink.

TABLE 1

| | | Ink | | | | | | |
|---|---|---|---|---|---|---|---|---|
| | | 1 | 2 | 3 | 4 | 5 | 6 | 7 |
| Coloring material | Black Pigment Dispersion Solution 1 | 40.0 | | | 40.0 | 40.0 | 40.0 | 40.0 |
| | Black Pigment Dispersion Solution 2 | | 40.0 | | | | | |

TABLE 1-continued

|  |  | Ink 1 | Ink 2 | Ink 3 | Ink 4 | Ink 5 | Ink 6 | Ink 7 |
|---|---|---|---|---|---|---|---|---|
|  | Black Pigment Dispersion Solution 3 |  |  | 40.0 |  |  |  |  |
|  | Black Pigment Dispersion Solution 4 |  |  |  |  |  |  |  |
| Water-soluble organic solvent | 2-Pyrrolidone | 7.0 | 7.0 | 7.0 | 10.0 |  |  |  |
|  | N-Methyl-2-pyrrolidone |  |  |  |  | 10.0 |  |  |
|  | 1,1,1-Trimethylolpropane |  |  |  |  |  | 7.0 | 7.0 |
|  | Diethylene glycol |  |  |  |  |  |  |  |
|  | Polyethylene glycol (*1) | 2.0 | 2.0 | 2.0 | 2.0 | 2.0 | 2.0 | 5.0 |
| Surfactant | Acetylenol EH (*2) | 0.1 | 0.1 | 0.1 | 0.1 | 0.1 | 0.1 | 0.1 |
| Ion-exchanged water |  | 50.9 | 50.9 | 50.9 | 47.9 | 47.9 | 50.9 | 47.9 |
| Content of water-soluble organic solvent (1) [mass %] (*3) |  | 7.0 | 7.0 | 7.0 | 10.0 | 10.0 | 7.0 | 7.0 |
| Content of water-soluble organic solvent (2) [mass %] (*4) |  | 7.0 | 7.0 | 7.0 | 10.0 | 10.0 | 7.0 | 7.0 |
| Content of water-soluble organic solvent (3) [mass %] (*5) |  | 9.0 | 9.0 | 9.0 | 12.0 | 12.0 | 9.0 | 12.0 |
| Content of water-soluble organic solvent (4) [mass %] (*6) |  | 0.0 | 0.0 | 0.0 | 0.0 | 0.0 | 0.0 | 0.0 |
| Content of water-soluble organic solvent (5) [mass %] (*7) |  | 2.0 | 2.0 | 2.0 | 2.0 | 2.0 | 2.0 | 5.0 |
| Content of free polymer having hydroxyl groups [mass %] |  | 0.37 | 0.50 | 0.35 | 0.37 | 0.37 | 0.37 | 0.37 |
| Content of polymer having hydroxyl groups [mass %] |  | 0.76 | 0.72 | 0.68 | 0.76 | 0.76 | 0.76 | 0.76 |
| Content of pigment [mass %] |  | 4.0 | 4.0 | 4.0 | 4.0 | 4.0 | 4.0 | 4.0 |
| Content of water-soluble organic solvent (1)/Content of free polymer having hydroxyl groups |  | 18.9 | 14.0 | 20.0 | 27.0 | 27.0 | 18.9 | 18.9 |
| Content of water-soluble organic solvent (5)/Content of water-soluble organic solvent (2) × 100 (%) |  | 28.6 | 28.6 | 28.6 | 20.0 | 20.0 | 28.6 | 71.4 |
| Content of water-soluble organic solvent (3)/Content of polymer having hydroxyl groups |  | 11.8 | 12.5 | 13.2 | 15.8 | 15.8 | 11.8 | 15.8 |
| Content of polymer having hydroxyl groups/Content of pigment × 100 [%] (*8) |  | 19.0 | 18.0 | 17.0 | 19.0 | 19.0 | 19.0 | 19.0 |

(*1) Average molecular weight: 1,000.
(*2) Acetylene glycol ethylene oxide adduct (product of Kawaken Fine Chemicals Co., Ltd.).
(*3) (1): content of a water-soluble organic solvent that is a poor medium for the free polymer having hydroxyl groups and is also a good medium for either one of Segment A and Segment B.
(*4) (2): content of a water-soluble organic solvent that is a good medium for either one of Segment A and Segment B.
(*5) (3): content of a water-soluble organic solvent that is a poor medium for the free polymer having hydroxly groups.
(*6) (4): content of a water-soluble organic solvent that is a good medium for both Segment A and Segment B.
(*7) (5): content of a water-soluble organic solvent that is a poor medium for both Segment A and Segment B.
(*8) proportion of the content of the polymer having hydroxyl groups to the content of the pigment when the content of the pigment is regarded as 100.

TABLE 2

|  |  | Ink 8 | Ink 9 | Ink 10 | Ink 11 | Ink 12 | Ink 13 | Ink 14 |
|---|---|---|---|---|---|---|---|---|
| Coloring material | Black Pigment Dispersion Solution 1 | 40.0 | 40.0 | 40.0 |  | 40.0 | 40.0 | 40.0 |
|  | Black Pigment Dispersion Solution 2 |  |  |  |  |  |  |  |
|  | Black Pigment Dispersion Solution 3 |  |  |  |  |  |  |  |
|  | Black Pigment Dispersion Solution 4 |  |  |  | 40.0 |  |  |  |
| Water-soluble organic solvent | 2-Pyrrolidone | 4.0 | 4.0 | 4.0 | 7.0 | 10.0 |  |  |
|  | N-Methyl-2-pyrrolidone |  |  |  |  |  |  |  |
|  | 1,1,1-Trimethylolpropane | 3.0 | 3.0 | 3.0 |  |  |  |  |
|  | Diethylene glycol | 3.0 | 6.0 | 8.0 |  |  | 10.0 |  |
|  | Polyethylene glycol (*1) | 2.0 |  |  | 2.0 | 3.0 | 2.0 | 10.0 |
| Surfactant | Acetylenol EH (*2) | 0.1 | 0.1 | 0.1 | 0.1 | 0.1 | 0.1 | 0.1 |

TABLE 2-continued

| | Ink | | | | | | |
|---|---|---|---|---|---|---|---|
| | 8 | 9 | 10 | 11 | 12 | 13 | 14 |
| Ion-exchanged water | 47.9 | 46.9 | 44.9 | 50.9 | 46.9 | 47.9 | 49.9 |
| Content of water-soluble organic solvent (1) [mass %] (*3) | 7.0 | 7.0 | 7.0 | 7.0 | 10.0 | 0.0 | 0.0 |
| Content of water-soluble organic solvent (2) [mass %] (*4) | 7.0 | 7.0 | 7.0 | 7.0 | 10.0 | 0.0 | 0.0 |
| Content of water-soluble organic solvent (3) [mass %] (*5) | 9.0 | 7.0 | 7.0 | 9.0 | 13.0 | 2.0 | 10.0 |
| Content of water-soluble organic solvent (4) [mass %] (*6) | 3.0 | 6.0 | 8.0 | 0.0 | 0.0 | 10.0 | 0.0 |
| Content of water-soluble organic solvent (5) [mass %] (*7) | 2.0 | 0.0 | 0.0 | 2.0 | 3.0 | 2.0 | 10.0 |
| Content of free polymer having hydroxyl groups [mass %] | 0.37 | 0.37 | 0.37 | 0.39 | 0.38 | 0.37 | 0.37 |
| Content of polymer having hydroxyl groups [mass %] | 0.76 | 0.76 | 0.76 | 0.80 | 0.76 | 0.76 | 0.76 |
| Content of pigment [mass %] | 4.0 | 4.0 | 4.0 | 4.0 | 4.0 | 4.0 | 4.0 |
| Content of water-soluble organic solvent (1)/Content of free polymer having hydroxyl groups | 18.9 | 18.9 | 18.9 | 17.9 | 26.3 | 0.0 | 0.0 |
| Content of water-soluble organic solvent (5)/Content of water-soluble organic solvent (2) × 100 (%) | 28.6 | 0.0 | 0.0 | 28.6 | 30.0 | — | — |
| Content of water-soluble organic solvent (3)/Content of polymer having hydroxyl groups | 11.8 | 9.2 | 9.2 | 11.3 | 17.1 | 2.6 | 13.2 |
| Content of polymer having hydroxyl groups/Content of pigment × 100 [%] (*8) | 19.0 | 19.0 | 19.0 | 20.0 | 19.0 | 19.0 | 19.0 |

(*1) Average molecular weight: 1,000.

(*2) Acetylene glycol ethylene oxide adduct (product of Kawaken Fine Chemicals Co., Ltd.).

(*3) (1): content of a water-soluble organic solvent that is a poor medium for the free polymer having hydroxyl groups and is also a good medium for either one of Segment A and Segment B.

(*4) (2) content of a water-soluble organic solvent that is a good medium for any one of Segment A and Segment B.

(*5) (3): content of a water-soluble organic solvent that is a poor medium for the free polymer having hydroxyl groups.

(*6) (4) content of a water-soluble organic solvent that is a good medium for both Segment A and Segment B.

(*7) (5): content of a water-soluble organic solvent that is a poor medium for both Segment A and Segment B.

(*8) proportion of the content of the polymer having hydroxyl groups to the content of the pigment when the content of the pigment is regarded as 100.

<Determination of Poor Medium or Good Medium>

With respect to the respective water-soluble organic solvents used in the preparation of the inks, whether they were a poor medium or a good medium was determined. To an aqueous solution of each water-soluble organic solvent diluted with ion-exchanged water to 50 mass %, was added 0.5 g of a 10 mass % aqueous solution of Polymer A dropwise, and the solution was left to stand for 4 days at room temperature in a closed state. Thereafter, the state after left to stand was compared with the initial state to determine the water-soluble organic solvent to be a poor medium when the solution became turbid or the presence of an oily substance or deposit was observed, or to be a good medium when the solution underwent no change.

Further, a 10 mass % aqueous solution of poly(2-hydroxyethyl acrylate) (10 mass % aqueous solution of Segment A) and a 10 mass % aqueous solution of poly(styrene-co-acrylic acid) (10 mass % aqueous solution of Segment B) were prepared for the respective segments constituting Polymer A. To an aqueous solution of each water-soluble organic solvent diluted with ion-exchanged water to 50 mass %, was added 0.5 g of each of the above-obtained two aqueous solutions dropwise, and the solution was left to stand for 4 days at room temperature in a closed state. Thereafter, the state after left to stand was compared with the initial state to determine the water-soluble organic solvent to be a poor medium when the solution became turbid or when the presence of an oily substance or deposit was observed, or to be a good medium when the solution underwent no change. The results are shown in Table 3. Incidentally, in Table 3, a poor medium was indicated by "Yes", and a good medium was indicated by "No".

TABLE 3

| | Determination result of poor medium | | |
|---|---|---|---|
| | Polymer A | Segment A | Segment B |
| 2-Pyrrolidone | Yes | Yes | No |
| N-Methyl-2-pyrrolidone | Yes | Yes | No |
| 1,1,1-Trimethylolpropane | Yes | Yes | No |
| Diethylene glycol | No | No | No |
| Polyethylene glycol (*1) | Yes | Yes | Yes |

(*1) Average molecular weight: 1,000.

<Evaluation>

(Seeping Out Phenomenon)

Each of the inks obtained above was stored into an ink cartridge, and the ink cartridge was installed at the position of the cyan ink of a modified ink jet recording apparatus "PIXUS 860i" (manufactured by Canon Inc.). After a head cleaning operation was then conducted twice to confirm that the ink has reached an ejection orifice, the main power of the ink jet recording apparatus was turned off. After the ink jet recording apparatus was left to stand for 2 weeks at room temperature in this state, the recording head was taken out of the apparatus without turning on the main power while the ink cartridge was kept installed, and the condition in the vicinity of the ejection orifices (nozzles) was observed through a microscope. The recording head was then installed again in the ink jet recording apparatus, the main power was turned on, and the head cleaning operation was conducted once. Thereafter, a nozzle check pattern was recorded. The ink was evaluated as to the seeping out phenomenon by the condition of the nozzles and the nozzle check pattern. The evaluation criteria of the seeping out phenomenon were as follows. The results of the evaluation are shown in Table 4.

[Evaluation Criteria of Seeping Out Phenomenon]

A: No seeping out phenomenon was observed on all nozzles, and recording failure was not recognized on the nozzle check pattern.

B: The seeping out phenomenon was observed on less than 1% of all nozzles, but recording failure was not recognized on the nozzle check pattern.

C: The seeping out phenomenon was observed on 1% or more and less than 5% of all nozzles, and recording failure was recognized on the nozzle check pattern in some of the nozzles.

D: The seeping out phenomenon was observed on 5% or more of all nozzles, and recording failure was recognized on the nozzle check pattern.

TABLE 4

|  |  | Ink | Seeping out phenomenon |
| --- | --- | --- | --- |
| Example | 1 | 1 | B |
|  | 2 | 2 | B |
|  | 3 | 3 | B |
|  | 4 | 4 | A |
|  | 5 | 5 | A |
|  | 6 | 6 | A |
|  | 7 | 7 | B |
|  | 8 | 8 | A |
|  | 9 | 9 | A |
|  | 10 | 10 | B |
|  | 11 | 11 | B |
|  | 12 | 12 | B |
| Comparative | 1 | 13 | D |
| Example | 2 | 14 | C |

With respect to the inks of Examples 1 to 3, 7 and 10 to 12 among the Examples, the evaluation results of which were ranked as B, the evaluation as to the seeping out phenomenon was made repeatedly 5 times in accordance with the same procedure as described above. As a result, in the inks according to Examples 2 and 11, ranking as C with the evaluation criteria occurred once. Accordingly, the inks according to Examples 2 and 11 were somewhat low in the effect to inhibit the seeping out phenomenon compared with the inks according to Examples 1, 3, 7, 10 and 12.

(Scratch Resistance)

Each of Inks 1 to 3, 8 and 9 obtained above was stored into an ink cartridge, and the ink cartridge was installed at the position of the black ink of a modified ink jet recording apparatus "PIXUS 860i" (manufactured by Canon Inc.). Thereafter, a solid print portion of 2 cm×2 cm and characters were recorded on a recording medium (PB Paper, product of Canon Inc.) to prepare a recorded matter. Incidentally, the ejection quantity per dot of the ink was within 30 ng±10%.

For the printer driver a default mode was selected.
Kind of paper: plain paper.
Print quality: standard.
Color adjustment: automatic.

After the recorded matter obtained above was left to stand for one minute at room temperature, the recorded portion was rubbed with a finger to visually observe the degree of stain of the solid printed portion, the characters and the finger, thereby evaluating the ink as to the scratch resistance. The criteria of the scratch resistance were as follows. The results of the evaluation are shown in Table 5.

[Evaluation Criteria of Scratch Resistance]

A: Scraping of the recorded portions is scarcely conspicuous at both solid-printed area and character-printed area, and no finger was soiled.

B: The solid-printed area or character-printed area is scraped off, and the finger was also soiled.

(Highlighter Resistance)

Each of Inks 1 to 3, 8 and 13 obtained above was stored into an ink cartridge, and the ink cartridge was installed at the position of the black ink of a modified ink jet recording apparatus "PIXUS 860i" (manufactured by Canon Inc.). Thereafter, a solid print portion of 2 cm×2 cm and characters were recorded on a recording medium (PB Paper, product of Canon Inc.) to prepare a recorded matter. Incidentally, the ejection quantity per dot of the ink was within 30 ng±10%.

For the printer driver a default mode was selected.
Kind of paper: plain paper.
Print quality: standard.
Color adjustment: automatic.

After the recorded matter obtained above was left to stand for one hour at room temperature, the character-printed area was marked once under an ordinary writing pressure with a yellow highlighter (Spot Writer, product of Pilot Pen Co., Ltd.), whereby the degree of stain of the recorded matter and the pen point was visually observed to evaluate the ink as to the highlighter resistance. The criteria of the highlighter resistance were as follows. The results of the evaluation are shown in Table 5.

[Evaluation Criteria of Highlighter Resistance]

A: Neither blurring of the recorded portions nor stain of white portions is observed, and the pen point is also not soiled.

B: No stain was observed on the white portions in the recorded matter, but the pen point is slightly soiled.

C: Stain was observed on the white portions in the recorded matter.

(Ejection Characteristics)

Each of Inks 1 to 3, 8 and 9 obtained above was stored into an ink cartridge, and the ink cartridge was installed at the position of the black ink of a modified ink jet recording apparatus "PIXUS 860i" (manufactured by Canon Inc.). Thereafter, a solid print portion having a recording density of 100% in a size of 2 cm×8 cm was recorded on a recording medium (PB Paper, product of Canon Inc.) with a drive frequency varied from 100 Hz to 1 kHz, 5 kHz, 10 kHz and 15 kHz to prepare a recorded matter. Incidentally, the ejection quantity per dot of the ink was within 30 ng±10%.

For the printer driver a default mode was selected.
Kind of paper: plain paper.
Print quality: standard.
Color adjustment: automatic.

The image densities and condition of unevenness of the solid printed images in the recorded matter obtained above, and the condition of ejection failure upon the recording were visually observed to evaluate the ink as to the ejection characteristics. The criteria of the ejection characteristics were as follows. The results of the evaluation are shown in Table 5.

[Evaluation Criteria of Ejection Characteristics]

A: No ejection failure occurs up to 10 kHz, and solid printed images obtained by recording at 10 kHz and 100 Hz are comparable in image density and unevenness when compared with each other.

B: No ejection failure occurs up to 10 kHz, but the solid printed image at 10 kHz is poorer in image density and condition of unevenness when compared with the solid printed image at 100 Hz.

C: Ejection failure occurs.

TABLE 5

| | | Ink | Scratch resistance | Highlighter resistance | Ejection characteristics |
|---|---|---|---|---|---|
| Example | 13 | 1 | A | A | A |
| | 14 | 2 | A | A | A |
| | 15 | 3 | A | A | A |
| | 16 | 8 | A | A | A |
| | 17 | 9 | A | A | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-314707, filed Oct. 28, 2005, which is hereby incorporated by reference herein in its entirety.

What is claimed is:

1. An aqueous ink jet ink comprising:
   a pigment;
   a water-soluble organic solvent comprising a water-soluble organic solvent (a) selected from the group consisting of 2-pyrrolidone, N-methyl-2-pyrrolidone, and 1,1,1-trimethylolpropane, and a water-soluble organic solvent (b) selected from the group consisting of glycerol and diethylene glycol, wherein a total content of the water-soluble organic solvent in the ink is between 7.0 mass % and to 50.0 mass % based on the total mass of the ink, and a content of the water-soluble organic solvent (a) is more than a content of the water-soluble organic solvent (b); and
   a polymer comprising a segment A having hydroxyl groups and a segment B having no hydroxyl groups, some of the polymer being adsorbed by the pigment and some of the polymer not being adsorbed by the pigment, wherein the polymer is selected such that the water-soluble organic solvent (a) is a poor medium for the non-adsorbed polymer and a good medium for either one of the segment A and the segment B and such that the water-soluble organic solvent (b) is a good medium for both the segment A and the segment B wherein a content of the water-soluble organic solvent, which is a poor medium for the non-adsorbed polymer and is also a good medium for either one of the segment A and the segment B, has a content 10 times or more as much as a content of the non-adsorbed polymer.

2. The aqueous ink jet ink according to claim 1, wherein the segment A comprises a repeating unit which is derived from at least one selected from the group consisting of 2-hydroxyethyl (meth)acrylate, hydroxypropyl(meth)acrylate, and polyvinyl alcohol, and the segment B comprises a repeating unit which is derived from (meth)acrylic ester monomer.

3. The aqueous ink jet ink according to claim 1, wherein a content of the polymer is less than 0.8 mass % based on the total mass of the ink.

4. The aqueous ink jet ink according to claim 1, wherein the water-soluble organic solvent (a) is N-methyl-2-pyrrolidone.

5. The aqueous ink jet ink according to claim 1, wherein the water-soluble organic solvent (a) is 1,1,1-trimethylolpropane.

6. The aqueous ink jet ink according to claim 1, wherein the polymer is an acrylic ester type block copolymer and the segment A is present at the terminal of the polymer.

7. The aqueous ink jet ink according to claim 1, wherein the segment A comprises a polyvinyl alcohol unit.

8. The aqueous ink jet ink according to claim 1, wherein the polymer is a neutralized poly(2-hydroxyethyl methacrylate)-b-poly(styrene-co-acrylic acid).

9. The aqueous ink jet ink according to claim 8, wherein the water-soluble organic solvent is diethylene glycol.

10. The aqueous ink jet ink according to claim 1, wherein the polymer is a neutralized poly(benzyl methacrylate-co-acrylic acid).

11. The aqueous ink jet ink according to claim 10, wherein the water-soluble organic solvent is diethylene glycol.

12. An ink jet recording method comprising ejecting an ink by an ink jet method to conduct recording on a recording medium, wherein the ink is the aqueous ink according to claim 1.

13. An ink cartridge comprising an ink storage portion storing an ink, wherein the ink is the aqueous ink according to claim 1.

14. A recording unit comprising an ink storage portion storing an ink and a recording head for ejecting the ink, wherein the ink is the aqueous ink according to claim 1.

15. An ink jet recording apparatus comprising an ink storage portion storing an ink and a recording head for ejecting the ink, wherein the ink is the aqueous ink according to claim 1.

* * * * *